US012695594B2

(12) United States Patent
Chen et al.

(10) Patent No.: US 12,695,594 B2
(45) Date of Patent: Jul. 28, 2026

(54) METHOD AND SYSTEM FOR PROTECTING PRIVACY IN MICROGRIDS BASED ON HOMOMORPHIC ENCRYPTION ALGORITHM

(71) Applicants:Hainan Research Institute of Zhejiang University, Sanya (CN); Zhejiang University, Hangzhou (CN)

(72) Inventors: Yulin Chen, Sanya (CN); Xing Huang, Sanya (CN); Donglian Qi, Sanya (CN); Yunfeng Yan, Sanya (CN); Xianbo Wang, Sanya (CN); Siqi Zhang, Sanya (CN)

(73) Assignees: Hainan Research Institute of Zhejiang University, Sanya (CN); Zhejiang University, Hangzhou (CN)

( * ) Notice: Subject to any disclaimer, the term of this patent is extended or adjusted under 35 U.S.C. 154(b) by 0 days.

(21) Appl. No.: 19/307,108

(22) Filed: Aug. 22, 2025

(65) Prior Publication Data

US 2026/0149562 A1     May 28, 2026

(30) Foreign Application Priority Data

Nov. 28, 2024    (CN) .......................... 202411721227.5

(51) Int. Cl.
*H04L 9/00*          (2022.01)
*G06Q 50/06*         (2024.01)
*H04L 9/30*          (2006.01)

(52) U.S. Cl.
CPC ............. *H04L 9/008* (2013.01); *G06Q 50/06* (2013.01); *H04L 9/30* (2013.01)

(58) Field of Classification Search
CPC ............ H04L 9/008; H04L 9/30; G06Q 50/06
See application file for complete search history.

(56) References Cited

U.S. PATENT DOCUMENTS

2022/0337563 A1* 10/2022 Weinfurtner ........ H04L 63/0428

FOREIGN PATENT DOCUMENTS

CN        115392699 A     11/2022
WO       2024225497 A1    10/2024

OTHER PUBLICATIONS

Dong Qiuxiang, et al., Cryptographic technologies enabling computation over encrypted data, Application Research of Computers, 2016, pp. 2561-2572, vol. 33, No. 9.

(Continued)

*Primary Examiner* — Hany S. Gadalla
(74) *Attorney, Agent, or Firm* — Bayramoglu Law Offices LLC

(57)                ABSTRACT

A method for protecting privacy in microgrids based on a homomorphic encryption algorithm and relates to the technical field of microgrid control includes: designing a distributed cooperative control method for a microgrid based on distributed control theory, to achieve frequency restoration of a microgrid; defining a technical essence of privacy protection and a scope of privacy protection; designing a method for protecting privacy in microgrids based on a homomorphic encryption algorithm according to defined technical essence of privacy protection and scope of privacy protection, and protecting initial and real-time values of each distributed power source in the microgrid from disclosure to neighbor nodes, to achieve a distributed cooperative control objective in the microgrid; and verifying the method for protecting privacy in microgrids based on the homomorphic encryption algorithm through simulation experiments. The method enhances trustworthy monitoring capabilities and privacy security during distributed cooperative operation of microgrids.

5 Claims, 3 Drawing Sheets
(1 of 3 Drawing Sheet(s) Filed in Color)

(56)     References Cited

OTHER PUBLICATIONS

Xing Huang, et al., Distributed Self-Triggered Privacy-Preserving Secondary Control of VSG-Based AC Microgrids, IEEE Transactions on Smart Grid, 2025, pp. 850-862, vol. 16, No. 2.
Huifeng Zhang, et al., Homomorphic Encryption-Based Resilient Distributed Energy Management Under Cyber-Attack of Micro-Grid With Event-Triggered Mechanism, IEEE Transactions on Smart Grid, 2024, pp. 5115-5126, vol. 15, No. 5.

* cited by examiner

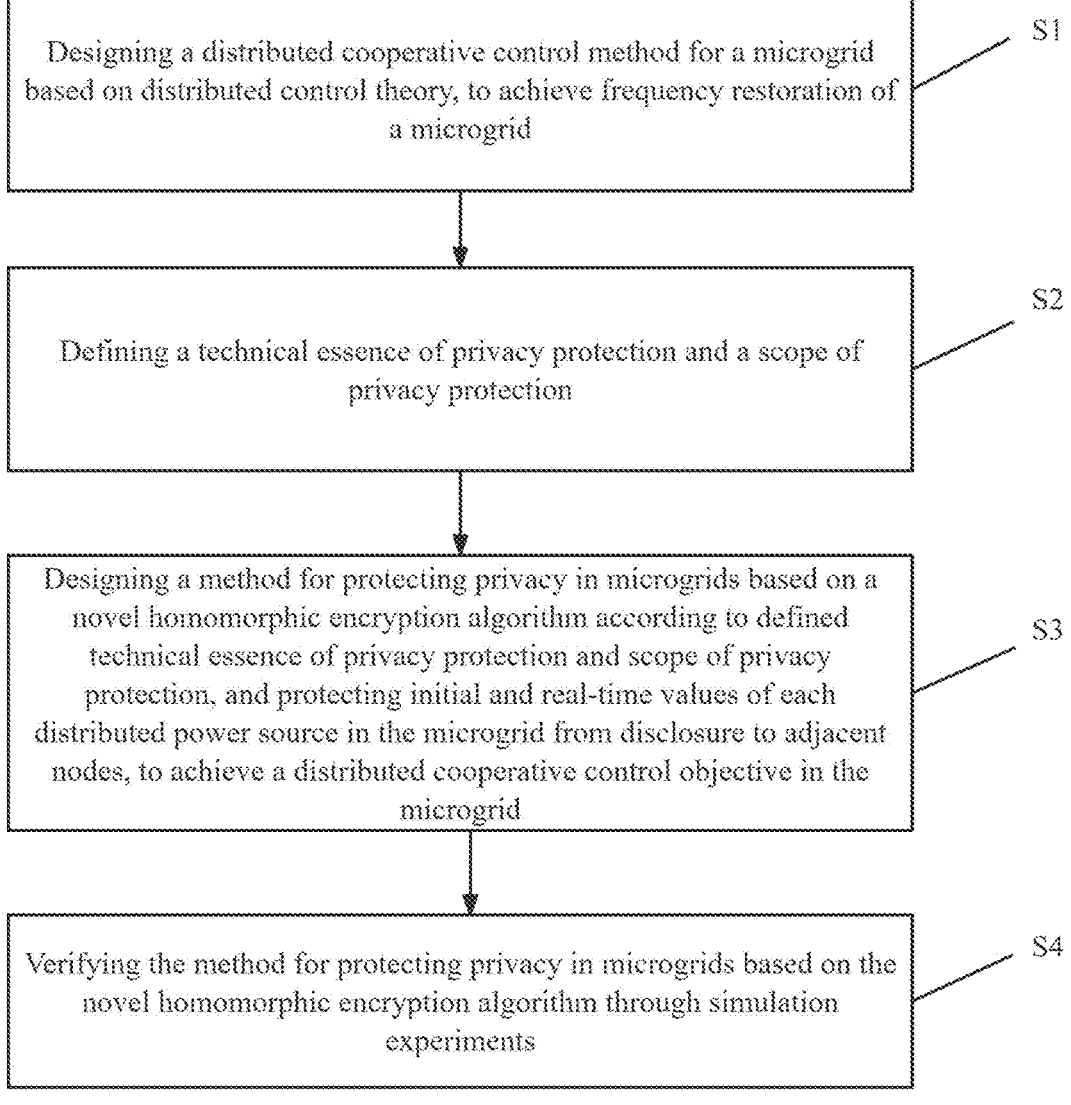

Designing a distributed cooperative control method for a microgrid based on distributed control theory, to achieve frequency restoration of a microgrid — S1

Defining a technical essence of privacy protection and a scope of privacy protection — S2

Designing a method for protecting privacy in microgrids based on a novel homomorphic encryption algorithm according to defined technical essence of privacy protection and scope of privacy protection, and protecting initial and real-time values of each distributed power source in the microgrid from disclosure to adjacent nodes, to achieve a distributed cooperative control objective in the microgrid — S3

Verifying the method for protecting privacy in microgrids based on the novel homomorphic encryption algorithm through simulation experiments — S4

FIG. 1

METHOD AND SYSTEM FOR PROTECTING PRIVACY IN MICROGRIDS BASED ON HOMOMORPHIC ENCRYPTION ALGORITHM

CROSS REFERENCE TO THE RELATED APPLICATIONS

This application is based upon and claims priority to Chinese Patent Application No. 202411721227.5, filed on Nov. 28, 2024, the entire contents of which are incorporated herein by reference.

TECHNICAL FIELD

The present invention relates to the technical field of microgrid control, and more particularly to a method and a system for protecting privacy in microgrids based on a homomorphic encryption algorithm.

BACKGROUND

With advancements in distributed energy technologies, an increasing number of distributed energy resources such as solar, wind, and biomass energy have been developed and integrated into power grids. The integration of these distributed energy resource systems mitigates reliance on centralized generation plants in legacy power grids, while enabling decentralized electricity provisioning that enhances power supply reliability and flexibility.

However, with the high-penetration integration of renewable energy resources, advancements in wide-area monitoring systems and intelligent control technologies facilitate intensified cyber-physical interdependencies within microgrids. thereby exacerbating risks of data privacy compromise in microgrids. The stable operation and collaborative control of the system will pose new challenges.

Therefore, it is an urgent problem for persons skilled in the art to provide a method and a system for protecting privacy in microgrids based on a homomorphic encryption algorithm, so as to resolve the difficulties existing in the prior art.

SUMMARY

Accordingly, the present disclosure provides a method and a system for protecting privacy in microgrids based on a homomorphic encryption algorithm, to enhance trustworthy monitoring capabilities and privacy security during distributed cooperative operation of microgrids.

To achieve the above objectives, the present invention adopts the following technical solution.

A method for protecting privacy in microgrids based on a homomorphic encryption algorithm, including:

S1. designing a distributed cooperative control method for a microgrid based on distributed control theory, to achieve frequency restoration of a microgrid;

S2. defining a technical essence of privacy protection and a scope of privacy protection;

S3. designing a method for protecting privacy in microgrids based on a homomorphic encryption algorithm according to defined technical essence of privacy protection and scope of privacy protection, and protecting initial and real-time values of each distributed power source in the microgrid from disclosure to neighbor nodes, to achieve a distributed cooperative control objective in the microgrid; and S4. verifying the method for protecting privacy in microgrids based on the homomorphic encryption algorithm through simulation experiments.

In the above method, optionally, in S1, the designing a distributed cooperative control method for a microgrid, specifically including:

An expression for droop control in the microgrid is given by:

$$\omega_i = \omega_{ni} - m_{pi}P_i \qquad (1)$$

wherein, $\omega_i$ is an output frequency value of the distributed power source i, $\omega_{ni}$ is a frequency setting of the distributed power source i, $P_i$ is an output active power value of the distributed power source i, and $m_{pi}$ is a droop control coefficient of the distributed power source i;

A specific expression for a frequency restoration target of the microgrid is given by:

$$\lim_{t \to \infty} \omega_i = \omega_{ref} \qquad (2)$$

wherein, $\omega_{ref}$ is a frequency reference value;

based on distributed control theory, the frequency setting of each distributed power source depends exclusively on topologically interconnected neighbor of the distributed power source, designing the frequency setting point $\omega_{ni}$ to restore frequencies of distributed power sources to a reference value, and an expression for the frequency setting point $\omega_{ni}$ is given by:

$$\omega_i = \omega_{ni} - m_{pi}P_i + u_{\omega i} + u_{Pi} \qquad (3)$$

wherein, $u_{\omega i}$ and $u_{Pi}$ are a frequency control input and an active power control input for the distributed power source i, respectively;

$u_{\omega i}$ is given by:

$$u_{\omega i} = -k_{\omega i}\sum_{j \in N_i} a_{ij}(\omega_i - \omega_j) - k_{\omega i}g_i(\omega_i - \omega_{ref}) \qquad (4)$$

wherein, $\omega_j$ is an output frequency value of the distributed power source j, $k_{\omega i}$ is frequency control gain of the distributed power source j, $g_i$ is frequency-dependent root gain of the distributed power source j, $a_{ij}$ is connection gain between the distributed power source i and the distributed power source j, and $N_i$ is a neighbor set of the distributed power source i;

$u_{Pi}$ is given by:

$$u_{Pi} = -k_{Pi}\sum_{j \in N_i} a_{ij}(m_{pi}P_i - m_{pj}P_j) \qquad (5)$$

wherein, $P_j$ is an output active power value of the distributed power source j, $m_{pj}$ is a droop control coefficient of the distributed power source j, and $k_{Pi}$ is active power control gain of the distributed power source i.

In the above method, optionally, in S2, defining a technical essence of privacy protection and a scope of privacy protection, protecting data of each distributed power source from disclosure to neighbor nodes during computational participation, and scope of privacy protection covers true values of both initial values and real-time values of each distributed power source participating in computations.

In the above method, optionally, in S3, protecting initial and real-time values of each distributed power source in the microgrid from disclosure to neighbor nodes, and defining the connection gain $a_{ij}$ as:

$$a_{ij} = a_{i \to j} \cdot a_{j \to i} \ \forall \ i, j \in V, \qquad (6)$$

$$a_{i \to j} \in [\underline{a}, \overline{a}] \ a_{j \to i} \in [\underline{a}, \overline{a}],$$

$$0 \le \underline{a} \le \overline{a} \le \frac{1}{\sqrt{\max\{|N_i^-|, |N_i^+|\}}},$$

wherein, $a_{i \to j} \in Z^+$ and $a_{j \to i} \in Z^+$ are unilateral gains randomly generated for the distributed power source i and the distributed power source j, respectively, $Z^+$ is a set of positive integers, $$|N_i^+| \text{ and } |N_i^-|$$

are an in-degree matrix and an out-degree matrix of the distributed power source i, respectively, $\underline{a}$ and $\overline{a}$ are a minimum value and a maximum value of the connection gain, respectively, $V=\{1, 2, \ldots n\}$, n is the total number of distributed power source.

In the above method, optionally, $$P_i^\kappa$$

represents data to be encrypted, and an improved Paillier homomorphic encryption algorithm, specifically including:

initialization: in the Paillier homomorphic encryption cryptosystem, both ciphertext $C_i$ and plaintext $P_i$ are positive integers, prior to applying the encryption method, according to the equation $$P_i = 10^\kappa \cdot P_i^\kappa,$$

converting $$P_i^\kappa$$

to an integer $P_i$, wherein k denotes the number of decimal places retained;

generating public key and private key: randomly selecting two large prime numbers p and q of identical bit-length, satisfying:

$$gcd(pq, (p-1)(q-1)) = 1$$

wherein, gcd(•) is a greatest common divisor function;

defining the public key as $$\left(pk_i^{[1]}, pk_i^{[2]}\right),$$

and the private key as $$\left(sk_i^{[1]}, sk_i^{[2]}\right),$$

wherein, $$pk_i^{[1]} = pq, sk_i^{[1]} = lcm(p-1, q-1),$$

lcm(•) is a least common multiple function, $$pk_i^{[2]} \in Z_n^+$$

is arbitrarily selected, provided that $$n = pk_i^{[1]} \cdot pk_i^{[1]} \text{ and } Z_n^+ = \{z \mid z \in Z \cap [0, n), gcd(z, n) = 1\}$$

are satisfied;

$$sk_i^{[2]} = L\left(\left(pk_i^{[2]}\right)^\lambda \text{mod } n\right)^{-1} \text{mod } pk_i^{[1]};$$

wherein $$L(x) = \frac{x-1}{pk_i^{[1]}},$$

mod denotes the modulo operation; $\lambda$=lcm(p−1, q−1);

encrypting: the ciphertext satisfies $$C_i = E_i(P_i) = \left(pk_i^{[2]}\right)^{P_i} \cdot r^{pk_i^{[1]}} \text{mod } n,$$

wherein, $r \in Z^+$, $0 < r < n$, $E_i$(•) is an encryption function;

decrypting: the plaintext satisfies $$P_i = D_i(C_i) = L\left((C_i)^{sk_i^{[1]}} \text{mod } n\right) \cdot sk_i^{[2]} \text{mod } pk_i^{[1]},$$

wherein $D_i$(•) is a decryption function;

deinitialize: derive plaintext $$P_i^\kappa$$

according to plaintext $P_i$, and a specific expression is:

$$P_i^\kappa = \begin{cases} P_i/10^\kappa & \text{if } 0 \le P_i \le \frac{1}{2}\left(pk_i^{[1]} - 1\right) \\ \left(P_i - pk_i^{[1]}\right)/10^\sigma & \text{if } \frac{1}{2}\left(pk_i^{[1]} + 1\right) \le P_i \le pk_i^{[1]} \end{cases} \qquad (7)$$

In the above method, optionally, the Paillier homomorphic encryption algorithm exhibits homomorphic addition and homostatic scalar multiplication properties, as expressed by:

$$E_i(P_i) \cdot E_i(P_j) = E_i(P_i + P_j), \qquad (8)$$

$$E_i(P_i)^\tau = E_i(\tau \cdot P_i),$$

wherein, $E_i(P_i)^\tau$ equals $E_i(P_i)$ raised to the power of $\tau$;
the method for protecting privacy in microgrids based on a homomorphic encryption algorithm specifically includes:

S301. the connection gain $a_{ij}$ is known to both the distributed power source i and distributed power source j, according to Formula (6), randomly splitting $a_{ij}$ into $a_{i \to j} \in Z^+$ and $a_{j \to i} \in Z^+$;

S302. generating the public key $$\left(pk_i^{[1]}, pk_i^{[2]}\right),$$

constructing the private key $$\left(sk_i^{[1]}, sk_i^{[2]}\right),$$

and computing the ciphertext $E_i(\omega_i(t))$ according to the Paillier homomorphic encryption algorithm, according to Formula (8), to obtain:

$$E_i(\omega_i(t))^{-1} = E_i(-\omega_i(t)) \qquad (9)$$

for the distributed power source i, transmitting a data packet $$\left\{E_i(-\omega_i(t)), pk_i^{[1]}, pk_i^{[2]}\right\}$$

to a distributed energy resource j, meanwhile, encrypting, by the distributed energy resource j, the frequency value with the received public key, to obtain $E_i(\omega_i(t))$ S303. applying the public key $$\left(pk_i^{[1]}, pk_i^{[2]}\right)$$

and the unilateral connection gain $a_{i \to j} \in Z^+$, to obtain:

$$E_i(-\omega_i(t)) \cdot E_i(\omega_j(t)) = E_i(\omega_j(t) - \omega_i(t)), \qquad (10)$$

$$E_i(\omega_j(t) - \omega_i(t))^{a_{j \to i}} = E_i(a_{j \to i} \cdot (\omega_j(t) - \omega_i(t))),$$

transmitting Formula (10) to the distributed power source i, decrypting $E_i(a_{j \to i} \cdot (\omega_j(t) - \omega_i(t)))$ into $a_{j \to i} \cdot (\omega_j(t) - \omega_i(t))$ by the distributed power source i, then multiplying by the unilateral connection gain $a_{i \to j} \in Z^+$, to obtain $a_{i \to j} \cdot a_{j \to i} \cdot (\omega_j(t) - \omega_i(t))$ i.e. $a_{ij} \cdot (\omega_i(t) - \omega_i(t))$, and performing distributed coordination in the microgrid by distributed power source i with Paillier homomorphic encryption without accessing information of distributed power source j.

In the above method, optionally, in S4, in simulation experiments, the microgrid is modeled using a MATLAB toolbox, while the Paillier homomorphic encryption algorithm is executed via a Python implementation.

A system for protecting privacy in microgrids based on a homomorphic encryption algorithm, executing the method for protecting privacy in microgrids based on a homomorphic encryption algorithm, including:

a distributed control module, based on distributed control theory, which is configured to implement distributed cooperative control of the microgrid;

an initialization module, which is configured to convert transmission data into integer form a public key/private key generation module, which is configured to generate the public key and the private key for data privacy protection;

an encryption module, which is configured to encrypt privacy-sensitive data during transmission;

a decryption module, which is configured to decrypt privacy-sensitive data during transmission;

a de-initialization module, which is configured to revert processed transmission data to the initial state;

a verification module, which is configured to validate the proposed method through simulation experiments.

As demonstrated by the above technical solution, compared to prior art, the present invention provides a method and a system for protecting privacy in microgrids based on a homomorphic encryption algorithm, with the following technical advantages: building upon conventional homomorphic encryption algorithms, the present invention develops a homomorphic encryption algorithm that overcomes three critical limitations of existing privacy-preserving approaches: low computational efficiency, limited supported operations, and excessive storage overhead-specifically in microgrid privacy protection systems. Moreover, the present invention achieves order-of-magnitude reductions in computational load and storage overhead-enabling real-time microgrid coordination while cryptographically preserving privacy-sensitive data of participating entities, thereby advancing the development of privacy-secure microgrid infrastructures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to describe the technical solutions in the embodiments of the present disclosure more clearly, the accompanying drawings required to describe the embodiments are briefly described below. Apparently, the accompanying drawings described below are only some embodiments of the present disclosure. Those of ordinary skill in the art may further obtain other accompanying drawings based on these accompanying drawings without creative efforts.

FIG. 1 illustrates a flowchart of a method for protecting privacy in microgrids based on a homomorphic encryption algorithm provided by the present invention;

DETAILED DESCRIPTION OF THE EMBODIMENTS

Figure 2:
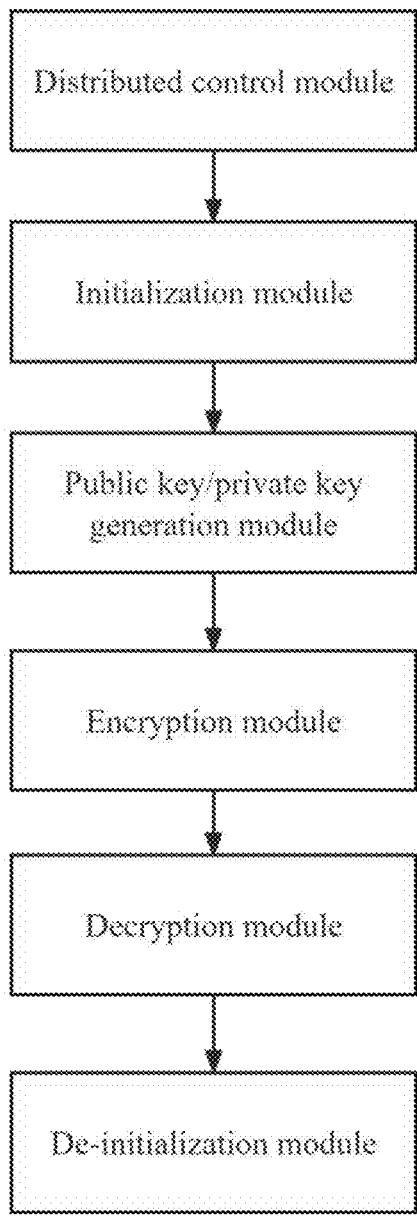
FIG. 2 is a block diagram of a system for protecting privacy in microgrids based on a homomorphic encryption algorithm provided by the present invention.

In the following, the technical scheme in the embodiment of the disclosure will be clearly and completely described in combination with the attached drawings in the embodiment of the disclosure. Apparently, the described embodiment is only a part of the embodiment of the disclosure, but not all of the embodiment. Based on the embodiments in the disclosure, all other embodiments obtained by those of ordinary skill in the art without creative efforts belong to the scope of protection in the disclosure.

In this application, relational terms such as first and second are used only to distinguish an entity or operation from another entity or operation, and do not necessarily require or imply the existence of any such actual relationship or order between those entities or operations. Moreover, the term "include", "comprise" or any other variation thereof is intended to cover non exclusive inclusion, thereby making a process, method, article or device that includes a range of elements not only include those elements, but also include other elements that are not clearly listed, or include the inherent elements of the process, method, object or equipment. Without more limitations, the elements limited by the statement "including a . . . " do not exclude the existence of other identical elements in the process, method, item, or device that includes the said elements.

As shown in FIG. 1, the present invention discloses a method for protecting privacy in microgrids based on a homomorphic encryption algorithm, including:

S1. a distributed cooperative control method for a microgrid is designed based on distributed control theory, to achieve frequency restoration of a microgrid;

S2. a technical essence of privacy protection and a scope of privacy protection are defined;

S3. a method for protecting privacy in microgrids based on a homomorphic encryption algorithm is designed according to defined technical essence of privacy protection and scope of privacy protection, and initial and real-time values of each distributed power source in the microgrid are protected from disclosure to neighbor nodes, to achieve a distributed cooperative control objective in the microgrid; and S4. the method for protecting privacy in microgrids based on the homomorphic encryption algorithm is verified through simulation experiments.

Further, in S1, the distributed cooperative control method for the microgrid is designed, specifically including:

an expression for droop control in the microgrid is given by:

$$\omega_i = \omega_{ni} - m_{pi}P_i \qquad (1)$$

wherein, $\omega_i$ is an output frequency value of the distributed power source i, $\omega_{ni}$ is a frequency setting of the distributed power source i, $P_i$ is an output active power value of the distributed power source i, and $m_{pi}$ is a droop control coefficient of the distributed power source i;

A specific expression for a frequency restoration target of the microgrid is given by:

$$\lim_{t \to \infty} \omega_i = \omega_{ref} \qquad (2)$$

wherein, $\omega_{ref}$ is a frequency reference value;

the frequency setting point $\omega_{ni}$ is designed to effect restoration of frequencies of distributed power sources to a reference value, based on distributed control theory, the frequency setting of each distributed power source depends exclusively on topologically interconnected neighbors of the distributed power source, the frequency setting point $\omega_{ni}$ is designed to restore frequencies of distributed power sources to a reference value, and an expression for the frequency setting point $\omega_{ni}$ is given by:

$$\omega_i = \omega_{ni} - m_{pi}P_i + u_{\omega i} + u_{Pi} \qquad (3)$$

wherein, $u_{\omega i}$ and $u_{Pi}$ are a frequency control input and an active power control input for the distributed power source i, respectively;

$u_{\omega i}$ is given by:

$$u_{\omega i} = -k_{\omega i}\sum_{j \in N_i} a_{ij}(\omega_i - \omega_j) - k_{\omega i}g_i(\omega_i - \omega_{ref}) \qquad (4)$$

wherein, $\omega_j$ is an output frequency value of the distributed power source j, $k_{\omega i}$ is frequency control gain of the distributed power source j, $g_i$ is frequency-dependent root gain of the distributed power source j, $a_{ij}$ is connection gain between the distributed power source i and the distributed power source j, and $N_i$ is a neighbor set of the distributed power source i;

$u_{Pi}$ is given by:

$$u_{Pi} = -k_{Pi}\sum_{j \in N_i} a_{ij}(m_{pi}P_i - m_{pj}P_j) \qquad (5)$$

wherein, $P_j$ is an output active power value of the distributed power source j, $m_{pj}$ is a droop control coefficient of the distributed power source j, and $k_{Pi}$ is active power control gain of the distributed power source i.

Further, in S2, the technical essence of privacy protection and the scope of privacy protection are defined, data of each distributed power source is protected from disclosure to neighbor nodes during computational participation, and scope of privacy protection covers true values of both initial values and real-time values of each distributed power source participating in computations;

more specific technical essence of privacy protection and broader scope of privacy protection are defined, both initial and real-time values of each distributed power source are protected from disclosure to topologically interconnected neighbor nodes, thereby establishing the basis for designing the method for protecting privacy in microgrids;

specifically, eavesdroppers are generally categorized into two classes: internal honest-but-curious eavesdroppers, and external malicious eavesdroppers;

the internal honest-but-curious eavesdroppers: private or sensitive transmitted information is intercepted, and attempts are made to compute initial and real-time states of other distributed power sources, which does not align with the interests of the distributed power sources itself;

the external malicious eavesdroppers: private and sensitive messages transmitted via communication links and sensors are intercepted, authentic information is maliciously tampered with, and erroneous states are anonymously propagated, thereby inducing hazardous operating states in the microgrid.

Further, in S3, in consideration of existing method for protecting privacy suffering from low computational efficiency, limited supported computation types, and high storage overhead, a homomorphic encryption algorithm is designed, and a method for protecting privacy in microgrids based on the homomorphic encryption algorithm is proposed, initial values and real-time values of each distributed power source in the microgrid are protected from disclosure to topologically interconnected neighbor nodes, while distributed coordinated control objectives of the microgrid are concurrently maintained;

In the context of frequency privacy protection, the core privacy leakage problem in the distributed control system is the disclosure of the real-time value for $\omega_i$ to other neighboring nodes of the distributed power source i.

Therefore, the transmitted $\omega_i - \omega_j$ value is encrypted using the Paillier homomorphic encryption scheme, whereby computation of $\omega_i - \omega_j$ in (4) is effectively enabled without requiring access to actual value $\omega_j$;

however, a vulnerability exists in the aforementioned information exchange mechanism, specifically wherein access to transmitted information of the distributed power source i by the distributed power source j is prevented. Nevertheless, corresponding information of the distributed power source j is inferable from Formula (4) through self-state information of distributed power source i, the decryption result $\omega_i - \omega_j$, and the edge weight $a_{ij}$.

To more comprehensively solve the above-mentioned problems, initial and real-time values of each distributed power source in the microgrid are protected from disclosure to neighbor nodes, and the connection gain $a_{ij}$ is defined as:

$$a_{ij} = a_{i \to j} \cdot a_{j \to i} \forall\, i, j \in V, \qquad (6)$$

$$a_{i \to j} \in [\underline{a}, \bar{a}]\, a_{j \to i} \in [\underline{a}, \bar{a}],$$

-continued
$$0 \le \underline{a} \le \bar{a} \le \frac{1}{\sqrt{\max\{|N_i^-|, |N_i^+|\}}},$$

wherein, $a_{i \to j} \in Z^+$ and $a_{j \to i} \in Z^+$ are unilateral gains randomly generated for the distributed power source i and the distributed power source j, respectively, $Z^+$ is a set of positive integers, $$|N_i^+|\ \text{and}\ |N_i^-|$$

are an in-degree matrix and an out-degree matrix of the distributed power source i, respectively, $\underline{a}$ and $\bar{a}$ are a minimum value and a maximum value of the connection gain, respectively, $V = \{1, 2, \ldots n\}$, and n is the total number of distributed power source.

Further, $$P_i^\kappa$$

represents data to be encrypted, and an improved Paillier homomorphic encryption algorithm, specifically including:

initialization: in the Paillier homomorphic encryption cryptosystem, both ciphertext $C_i$ and plaintext $P_i$ are positive integers, prior to applying the encryption method, according to the equation $$P_i = 10^\kappa \cdot P_i^\kappa, P_i^\kappa$$

is converted to an integer $P_i$, wherein k denotes the number of decimal places retained;

generating public key and private key: two large prime numbers p and q of identical bit-length are randomly selected, satisfying:

$$gcd(pq, (p-1)(q-1)) = 1$$

wherein, $gcd(\bullet)$ is a greatest common divisor function;

the public key is defined as $$\left(pk_i^{[1]}, pk_i^{[2]}\right),$$

and the private key defin as $$\left(sk_i^{[1]}, sk_i^{[2]}\right),$$

wherein $$pk_i^{[1]} = pq,\, sk_i^{[1]} = lcm(p-1, q-1),$$

lcm($\bullet$) is a least common multiple function, $$pk_i^{[2]} \in Z_n^+$$

is arbitrarily selected, provided that $$n = pk_i^{[1]} \cdot pk_i^{[1]} \text{ and } Z_n^+ = \{z \mid z \in Z \cap [0, n), gcd(z, n) = 1\}$$

are satisfied;

$$sk_i^{[2]} = L\left(\left(pk_i^{[2]}\right)^\lambda \bmod n\right)^{-1} \bmod pk_i^{[1]};$$

wherein $$L(x) = \frac{x-1}{pk_i^{[1]}},$$

mod denotes the modulo operation; $\lambda = \text{lcm}(p-1, q-1)$; encrypting: the ciphertext satisfies $$C_i = E_i(P_i) = \left(pk_i^{[2]}\right)^{P_i} \cdot r^{pk_i^{[1]}} \bmod n,$$

wherein, $r \in Z^+$, $0 < r < n$, $E_i(\bullet)$ is an encryption function; decrypting: the plaintext satisfies $$P_i = D_i(C_i) = L\left((C_i)^{sk_i^{[1]}} \bmod n\right) \cdot sk_i^{[2]} \bmod pk_i^{[1]},$$

wherein $D_i(\bullet)$ is a decryption function; deinitialize: derive plaintext $$P_i^\kappa$$

according to plaintext $P_i$, and a specific expression is:

$$P_i^\kappa = \begin{cases} P_i / 10^\kappa & \text{if } 0 \le P_i \le \frac{1}{2}\left(pk_i^{[1]} - 1\right) \\ \left(P_i - pk_i^{[1]}\right) / 10^\sigma & \text{if } \frac{1}{2}\left(pk_i^{[1]} + 1\right) \le P_i \le pk_i^{[1]} \end{cases} \quad (7)$$

Further, the Paillier homomorphic encryption algorithm exhibits homomorphic addition and homostatic scalar multiplication properties, as expressed by:

$$E_i(P_i) \cdot E_i(P_j) = E_i(P_i + P_j), \quad (8)$$
$$E_i(P_i)^\tau = E_i(\tau \cdot P_i),$$

wherein, $E_i(P_i)^\tau$ equals $E_i(P_i)$ raised to the power of $\tau$; the method for protecting privacy in microgrids based on a homomorphic encryption algorithm specifically includes:

S301. the connection gain $a_{ij}$ is known to both the distributed power source i and distributed power source j, according to Formula (6), randomly splitting $a_{ij}$ into $a_{i \to j} \in Z^+$ and $a_{j \to i} \in Z^+$;

S302. the public key $$\left(pk_i^{[1]}, pk_i^{[2]}\right)$$

is generated, the private key $$\left(sk_i^{[1]}, sk_i^{[2]}\right)$$

is constructed, and the ciphertext $E_i(\omega_i(t))$ is computed according to the Paillier homomorphic encryption algorithm, according to Formula (8), to obtain:

$$E_i(\omega_i(t))^{-1} = E_i(-\omega_i(t)) \quad (9)$$

for the distributed power source i,ing a data packet $$\left\{E_i(-\omega_i(t)), pk_i^{[1]}, pk_i^{[2]}\right\}$$

is transmitted to the distributed energy resource j, meanwhile, the frequency value is encrypted by the distributed energy resource j with the received public key, to obtain $E_i(\omega_j(t))$; and S303. the public key $$\left(pk_i^{[1]}, pk_i^{[2]}\right)$$

and the unilateral connection gain $a_{i \to j} \in Z^+$ are applied, to obtain:

$$E_i(-\omega_i(t)) \cdot E_i(\omega_j(t)) = E_i(\omega_j(t) - \omega_i(t)), \quad (10)$$
$$E_i(\omega_j(t) - \omega_i(t))^{a_{j \to i}} = E_i(a_{j \to i} \cdot (\omega_j(t) - \omega_i(t))),$$

Formula (10) is transmitted to the distributed power source i, $E_i(a_{j \to i} * (\omega_j(t) - \omega_i(t)))$ is decrypted into $a_{j \to i} * (\omega_j(t) - \omega_i(t))$ by the distributed power source i, then being multiplied by the unilateral connection gain $a_{i \to j} \in Z^+$, to obtain $a_{i \to j} \cdot a_{j \to i} \cdot (\omega_j(t) - \omega_i(t))$ i.e. $a_{ij} \cdot (\omega_j(t) - \omega_i(t))$, and distributed coordination in the microgrid is performed by distributed power source i with Paillier homomorphic encryption without accessing information of distributed power source j.

Further, in S4, in simulation experiments, the microgrid is modeled using a MATLAB toolbox, while the Paillier homomorphic encryption algorithm is executed via a Python implementation.

A system for protecting privacy in microgrids based on a homomorphic encryption algorithm, executing the method for protecting privacy in microgrids based on the homomorphic encryption algorithm, including:

a distributed control module, based on distributed control theory, which is configured to implement distributed cooperative control of the microgrid;

an initialization module, which is configured to convert transmission data into integer form a public key/private key generation module, which is configured to generate the public key and the private key for data privacy protection;

an encryption module, which is configured to encrypt privacy-sensitive data during transmission;

a decryption module, which is configured to decrypt privacy-sensitive data during transmission;

a de-initialization module, which is configured to revert processed transmission data to the initial state; and a verification module, which is configured to validate the proposed method through simulation experiments.

In a specific embodiment, simulation experiments are conducted on a computer equipped with an Intel® Core™ i7-12700H processor and 32 GB RAM, wherein a microgrid system is modeled using MATLAB® Simulink® toolbox (version 2021b), and the Paillier homomorphic encryption algorithm is implemented through Python 3.8.6.

To verify the effectiveness of the proposed method for protecting privacy in microgrids based on the homomorphic encryption algorithm, the simulation process is designed as follows:

t=0 s, the microgrid transitions into islanded operation mode;

t=1.5 s, a distributed secondary control method of the microgrid is applied;

t=4 s, the load is increased by 3 kW; and t=6 s, the load is decreased by 3 kW.

The entire simulation time is 8 seconds, and the method for protecting privacy in microgrids based on the homomorphic encryption algorithm disclosed in the present invention is applied throughout the entire simulation period.

Figure 3:
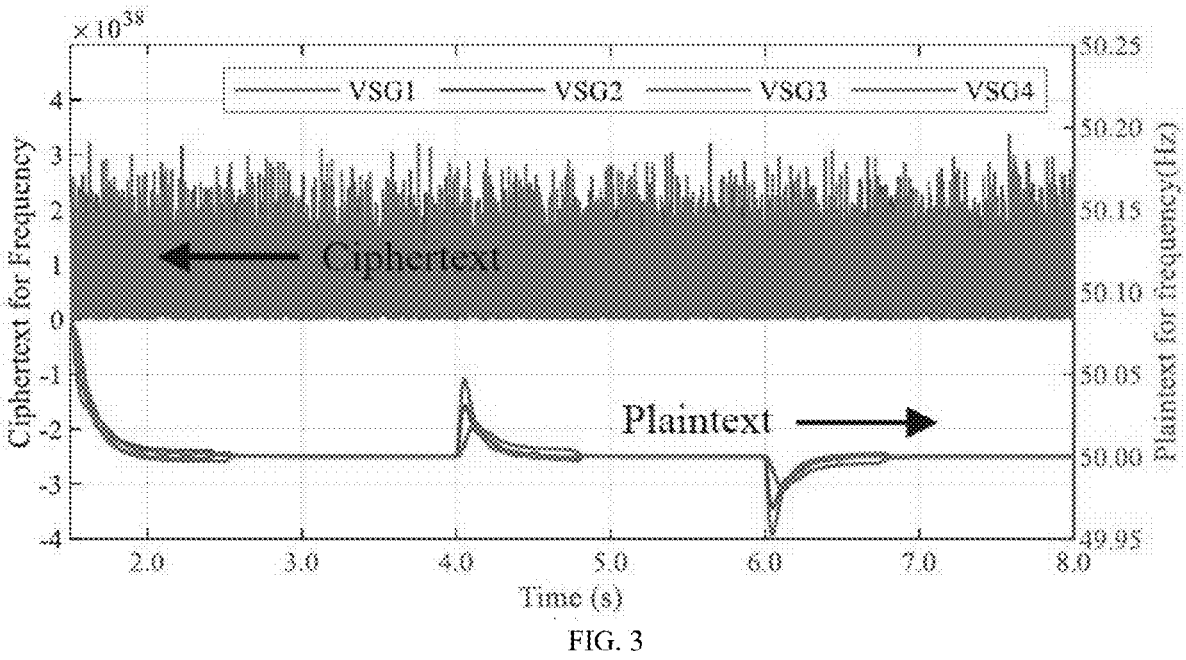
FIG. 3 is a schematic diagram showing real frequencies and encrypted frequencies of distributed power sources in a simulation experiment using the microgrid privacy protection method based on the homomorphic encryption algorithm according to the present invention.

With reference to FIG. 3, a schematic diagram is shown illustrating convergence under application of the method for protecting privacy in microgrids based on the homomorphic encryption algorithm disclosed in the present invention, and plaintext (real data) and ciphertext (encrypted data) of distributed power source frequencies are respectively applied; wherein the ciphertext, computed according to the Paillier homomorphic encryption method, corresponds to the left vertical axis; the plaintext corresponds to the right vertical axis; and in the convergence diagram, the upper half represents the ciphertext while the lower half represents the plaintext.

By comparison between upper and lower portions of each subfigure, encrypted data of each distributed power source is consistently observed to differ from real data in all cases. Moreover, it can be seen that although the real state has converged to the predesigned reference value, the ciphertext of each distributed power source remains random for any positive integers r, p, q selected. Therefore, simulation results confirm the theoretical analysis that eavesdroppers cannot infer the actual state of distributed power sources without access to the private key.

Figure 4:
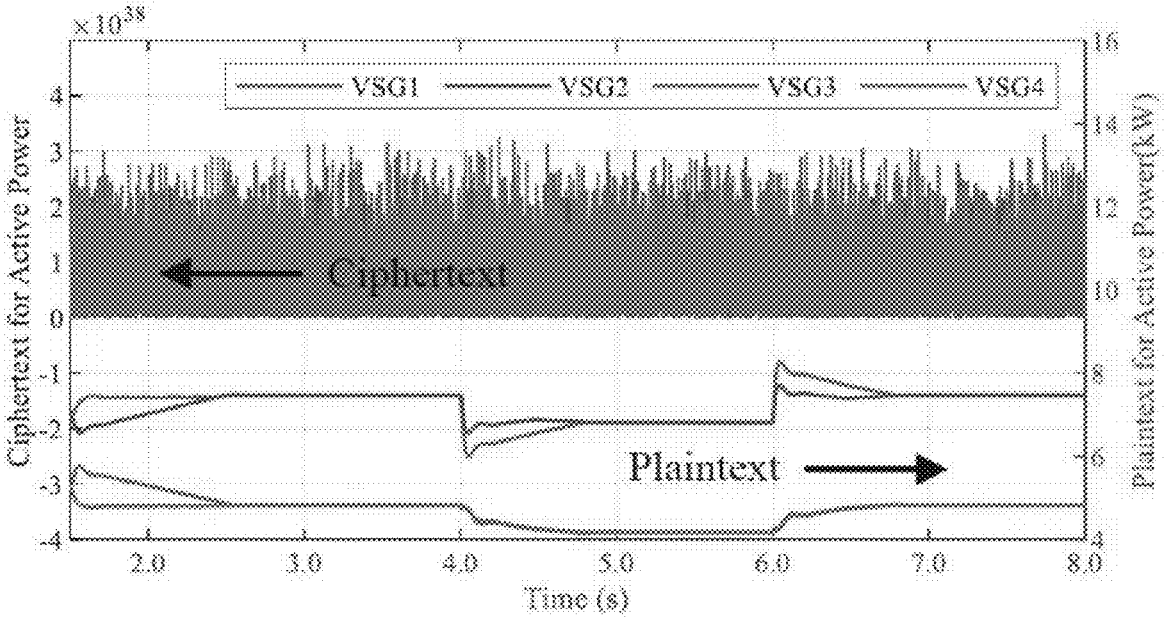
FIG. 4 is a schematic diagram showing real active power and encrypted active power outputs from distributed power sources in a simulation experiment implementing the microgrid privacy protection method based on the homomorphic encryption algorithm according to the present invention

With reference to FIG. 4, a schematic diagram is provided illustrating the plaintext and ciphertext of active power for each distributed power source under the method for protecting privacy in microgrids based on the homomorphic encryption algorithm proposed in the present invention. The simulation results of active power correspond to the grid frequency. Therefore, the method for protecting privacy in microgrids based on the Paillier homomorphic encryption algorithm effectively prevents leakage of private information to eavesdroppers.

Various embodiments of the present specification are described in a progressive manner, the same or similar parts between the various embodiments are referred to with each other, and each embodiment focuses on a description that is different from the other embodiments. In particular, for a system or a system embodiment, because it is basically similar to a method embodiment, the description is relatively simple, and the correlation can be seen in the part of the method embodiment. The system and its system embodiment described above are only schematic, wherein the units described as separation components may be or may not be physically separated, and components displayed as units may or may not be physical units, that is, they can be located in one place, or they can be distributed to multiple network units. According to actual needs, some or all modules can be selected to achieve the purpose of this embodiment. The ordinary technical personnel in this field can understand and implement it without creative efforts.

The above description of the disclosed embodiments enables those skilled in the art to implement or use the present disclosure. Various amendments to the embodiments will be apparent to those skilled in the art. The general principles defined herein may be implemented in other embodiments without departing from the spirit or scope of the disclosure. Therefore, the present disclosure will not be limited to the embodiments shown herein but is to be accorded the widest scope consistent with the principles and features disclosed herein.

The invention claimed is:

1. A method for protecting privacy in microgrids based on a homomorphic encryption algorithm, comprising:

S1: designing a distributed cooperative control method for a microgrid based on a distributed control theory, to achieve frequency restoration of the microgrid;

wherein in S1, the designing the distributed cooperative control method for the microgrid comprises:

an expression for droop control in the microgrid is given by:

$$\omega_i = \omega_{ni} - m_{pi}P_i \tag{1}$$

wherein, $\omega_i$ is an output frequency value of a distributed power source i, $\omega_{ni}$ is a frequency setting of the distributed power source i, $P_i$ is an output active power value of the distributed power source i, and $m_{pi}$ is a droop control coefficient of the distributed power source i;

a specific expression for a frequency restoration target of the microgrid is given by:

$$\lim_{t \to \infty} \omega_i = \omega_{ref} \tag{2}$$

wherein, $\omega_{ref}$ is a frequency reference value;

based on the distributed control theory, the frequency setting of each distributed power source depends exclusively on topologically interconnected neighbor of the distributed power source, designing a frequency setting point $\omega_{ni}$ to restore frequencies of distributed power sources to a reference value, and an expression for the frequency setting point $\omega_{ni}$ is given by:

$$\omega_i = \omega_{ni} - m_{pi}P_i + u_{\omega i} + u_{Pi} \tag{3}$$

wherein, $u_{\omega i}$ and $u_{Pi}$ are a frequency control input and an active power control input for the distributed power source i, respectively;

$u_{\omega i}$ is given by:

$$u_{\omega i} = -k_{\omega i} \sum_{j \in N_i} a_{ij}(\omega_i - \omega_j) - k_{\omega i} g_i(\omega_i - \omega_{ref}) \tag{4}$$

wherein, $\omega_j$ is an output frequency value of a distributed power source j, $k_{\omega i}$ is a frequency control gain of the distributed power source j, $g_i$ is a frequency-dependent root gain of the distributed power source j, $a_{ij}$ is a connection gain between the distributed power source i and the distributed power source j, and $N_i$ is a neighbor set of the distributed power source i;

$u_{Pi}$ is given by:

$$u_{Pi} = -k_{Pi} \sum_{j \in N_i} a_{ij}(m_{pi}P_i - m_{pj}P_j) \tag{5}$$

wherein, $P_j$ is an output active power value of the distributed power source j, $m_{pj}$ is a droop control coefficient of the distributed power source j, and $k_{Pi}$ is an active power control gain of the distributed power source i;

S2: defining a technical essence of privacy protection and a scope of privacy protection;

S3: designing a method for protecting privacy in the microgrids based on the homomorphic encryption algorithm according to the technical essence of privacy protection and the scope of privacy protection, and protecting initial and real-time values of each distributed power source in the microgrid from disclosure to neighbor nodes, to achieve a distributed cooperative control objective in the microgrid;

wherein a Paillier homomorphic encryption algorithm exhibits homomorphic addition and homostatic scalar multiplication properties, as expressed by:

$$E_i(P_i) \cdot E_i(P_j) = E_i(P_i + P_j), \tag{8}$$

$$E_i(P_i)^\tau = E_i(\tau \cdot P_i), \tag{8}$$

wherein, $E_i(P_i)^\tau$ equals $E_i(P_i)$ raised to a power of $\tau$ wherein the method for protecting privacy in the microgrids based on the homomorphic encryption algorithm comprises:

S301: the connection gain $a_{ij}$ is known to both the distributed power source i and the distributed power source j, according to Formula (6), randomly splitting $a_{ij}$ into $a_{i \to j} \in Z^+$ and $a_{j \to i} \in Z^+$;

S302: generating a public key $$\left(pk_i^{[1]}, pk_i^{[2]}\right),$$

constructing a private key $$\left(sk_i^{[1]}, sk_i^{[2]}\right),$$

and computing a ciphertext $E_i(\omega_i(t))$ according to the Paillier homomorphic encryption algorithm, according to Formula (8), to obtain:

$$E_i(\omega_i(t))^{-1} = E_i(-\omega_i(t)) \tag{9}$$

for the distributed power source i, transmitting a data packet $$\left\{E_i(-\omega_i(t)), pk_i^{[1]}, pk_i^{[2]}\right\}$$

to the distributed energy resource j, meanwhile, encrypting, by the distributed energy resource j, a frequency value with the public key, to obtain $E_i(\omega_i(t))$; and S303: applying the public key $$\left(pk_i^{[1]}, pk_i^{[2]}\right)$$

and a unilateral connection gain $a_{j \to i} \in Z^+$, to obtain:

$$E_i(-\omega_i(t)) \cdot E_i(\omega_j(t)) = E_i(\omega_j(t) - \omega_i(t)), \tag{10}$$

$$E_i(\omega_j(t) - \omega_i(t))^{a_{j \to i}} = E_i(a_{j \to i} \cdot (\omega_j(t) - \omega_i(t))),$$

transmitting Formula (10) to the distributed power source i, decrypting $E_i(a_{j \to i} \cdot (\omega_j(t) - \omega_i(t)))$ into $a_{j \to i} \cdot (\omega_j(t) - \omega_i(t))$ by the distributed power source i, then multiplying by the unilateral connection gain $a_{i \to j} \in Z^+$, to obtain $a_{i \to j} \cdot a_{j \to i} \cdot (\omega_j(t) - \omega_i(t))$ i.e. $a_{ij} \cdot (\omega_j(t) - \omega_i(t))$, and performing distributed coordination in the microgrid by the distributed power source i with Paillier homomorphic encryption without accessing information of the distributed power source j; and S4: verifying the method for protecting privacy in the microgrids based on the homomorphic encryption algorithm through simulation experiments.

2. The method for protecting privacy in the microgrids based on the homomorphic encryption algorithm according to claim 1, wherein S2 comprises: defining the technical essence of privacy protection and the scope of privacy protection, and protecting data of each distributed power source from disclosure to the neighbor nodes during computational participation, wherein the scope of privacy protection covers true values of both initial values and real-time values of each distributed power source participating in computations.

3. The method for protecting privacy in the microgrids based on the homomorphic encryption algorithm according to claim 1, wherein S3 comprises: protecting the initial and real-time values of each distributed power source in the microgrid from disclosure to the neighbor nodes, and defining the connection gain $a_{ij}$ as:

$$a_{ij} = a_{i \to j} \cdot a_{j \to i} \forall i, j \in V, \tag{6}$$

$$a_{i \to j} \in [\underline{a}, \overline{a}] a_{j \to i} \in [\underline{a}, \overline{a}],$$

-continued $$0 \le \underline{a} \le \overline{a} \le \frac{1}{\sqrt{\max\{|N_i^-|, |N_i^+|\}}},$$

wherein, $a_{i \to j} \in Z^+$ and $a_{j \to i} \in Z^+$ are unilateral gains randomly generated for the distributed power source i and the distributed power source j, respectively, $Z^+$ is a set of positive integers, $$|N_i^+| \text{ and } |N_i^-|$$

are an in-degree matrix and an out-degree matrix of the distributed power source i, respectively, $\underline{a}$ and $\overline{a}$ are a minimum value and a maximum value of the connection gain, respectively, $V=\{1, 2, \ldots n\}$, and n is a total number of distributed power source.

4. The method for protecting privacy in the microgrids based on the homomorphic encryption algorithm according to claim 3, wherein $$P_i^\kappa$$

represents data to be encrypted, and the Paillier homomorphic encryption algorithm comprises:
  initialization: in a Paillier homomorphic encryption cryptosystem, both a ciphertext $C_i$ and a plaintext $P_i$ are positive integers, prior to applying the encryption method, according to the equation $$P_i = 10^\kappa \cdot P_i^\kappa,$$

converting $$P_i^\kappa$$

to an integer $P_i$, wherein k denotes a number of decimal places retained;
  generating public key and private key: randomly selecting two large prime numbers p and q of identical bit-length, satisfying:

$$gcd(pq, (p-1)(q-1)) = 1$$

wherein, gcd(•) is a greatest common divisor function;
  defining the public key as $$\left(pk_i^{[1]}, pk_i^{[2]}\right),$$

and the private key as $$\left(sk_i^{[1]}, sk_i^{[2]}\right),$$

wherein, $$pk_i^{[1]} = pq, sk_i^{[1]} = lcm(p-1, q-1),$$

lcm(•) is a least common multiple function, $$pk_i^{[2]} \in Z_n^+$$

is arbitrarily selected, provided that $$n = pk_i^{[1]} \cdot pk_i^{[1]} \text{ and } Z_n^+ = \{z \mid z \in Z \cap [0, n), gcd(z, n) = 1\}$$

are satisfied;

$$sk_i^{[2]} = L\left(\left(pk_i^{[2]}\right)^\lambda \bmod n\right)^{-1} \bmod pk_i^{[1]};$$

wherein $$L(x) = \frac{x-1}{pk_i^{[1]}},$$

mod denotes a modulo operation; $\lambda = lcm(p-1, q-1)$;
  encrypting: the ciphertext satisfies $$C_i = E_i(P_i) = \left(pk_i^{[2]}\right)^{P_i} \cdot r^{pk_i^{[1]}} \bmod n,$$

wherein, $r \in Z^+$, $0 < r < n$, $E_i(•)$ is an encryption function;
  decrypting: the plaintext satisfies $$P_i = D_i(C_i) = L\left((C_i)^{sk_i^{[1]}} \bmod n\right) \cdot sk_i^{[2]} \bmod pk_i^{[1]},$$

wherein $D_i(•)$ is a decryption function; and
  deinitialize: derive a plaintext $$P_i^\kappa$$

according to the plaintext $P_i$, and a specific expression is:

$$P_i^\kappa = \begin{cases} P_i/10^\kappa & \text{if } 0 \le P_i \le \frac{1}{2}\left(pk_i^{[1]} - 1\right) \\ (P_i - pk_i^{[1]})/10^\sigma & \text{if } \frac{1}{2}\left(pk_i^{[1]} + 1\right) \le P_i \le pk_i^{[1]} \end{cases}. \quad (7)$$

5. The method for protecting privacy in the microgrids based on the homomorphic encryption algorithm according to claim 1, wherein in S4, in the simulation experiments, the microgrid is modeled using a MATLAB toolbox, while the Paillier homomorphic encryption algorithm is executed via a Python implementation.

\* \* \* \* \*